United States Patent [19]
Hatjasalo et al.

[11] Patent Number: 6,077,793
[45] Date of Patent: Jun. 20, 2000

[54] METHOD FOR PRODUCING ELASTIC PROTECTIVE MATERIAL AND ELASTIC PROTECTIVE MATERIAL

[75] Inventors: Leo Hatjasalo; Jarkko Valtanen, both of Helsinki, Finland

[73] Assignee: Oy OMS Optomedical Systems Ltd., Helsinki, Finland

[21] Appl. No.: 09/029,079

[22] PCT Filed: Aug. 6, 1996

[86] PCT No.: PCT/FI96/00430

§ 371 Date: Jun. 26, 1998

§ 102(e) Date: Jun. 26, 1998

[87] PCT Pub. No.: WO97/07859

PCT Pub. Date: Mar. 6, 1997

[30] Foreign Application Priority Data

Aug. 24, 1995 [FI] Finland ..................... 953976

[51] Int. Cl.[7] .................. D04B 7/34; B32B 5/02
[52] U.S. Cl. ............... 442/65; 442/105; 442/134; 442/164; 442/312; 442/313; 66/174
[58] Field of Search .................... 442/312, 313, 442/65, 105, 134, 164; 66/174

[56] References Cited

U.S. PATENT DOCUMENTS

| | | | |
|---|---|---|---|
| 4,259,377 | 3/1981 | Baize | 427/346 |
| 4,742,578 | 5/1988 | Seid | 2/2.5 |
| 4,858,245 | 8/1989 | Sullivan et al. | 2/21 |
| 5,087,499 | 2/1992 | Sullivan | 428/85 |
| 5,423,168 | 6/1995 | Kolmes et al. | 57/229 |
| 5,564,127 | 10/1996 | Manne | 2/161.7 |

FOREIGN PATENT DOCUMENTS

| 931396 | of 1994 | Finland . |
|---|---|---|
| WO 91/02466 | 3/1991 | WIPO . |

*Primary Examiner*—Christopher Raimund
*Attorney, Agent, or Firm*—Pollock, Vande Sande & Amernick

[57] ABSTRACT

An elastic protective material is disclosed. The protective material comprises a three-dimensional fully fashioned knit structure made by single jersey knitting at a machine gauge of at least 10 needles per inch. This knit layer is completely surrounded on both surfaces by an antiseptic and sterilizable elastomer or polymer. A method of making the elastic protective material is also disclosed.

15 Claims, 1 Drawing Sheet

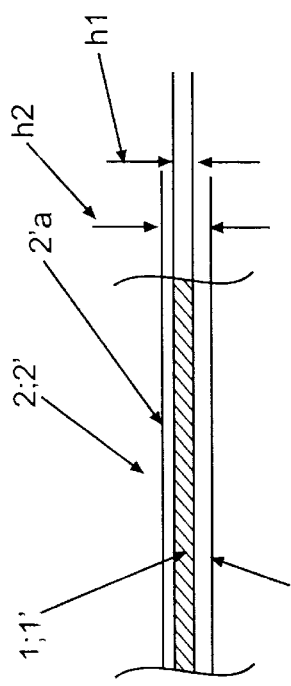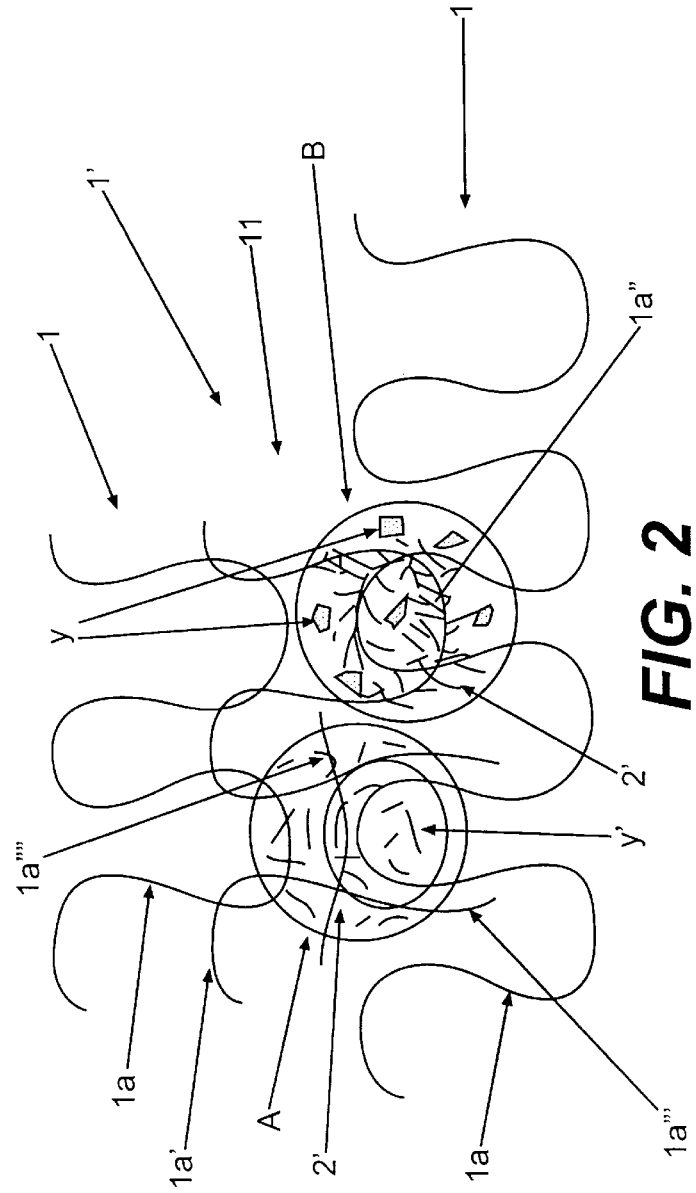

METHOD FOR PRODUCING ELASTIC PROTECTIVE MATERIAL AND ELASTIC PROTECTIVE MATERIAL

FIELD OF THE INVENTION

The invention relates to a method for producing elastic protective material, which is formed of at least two part materials being in connection with each other. The first part material is intended particularly to give mechanical protection, such as to prevent a concrete object from breaking through the same. The second part material is intended particularly to give non-mechanical protection, such as to prevent gas, liquid and/or like from going through the same. To achieve an elastic protective material the first part material is produced at least partly by knitting preferably from polymer fiber material or the like. The second part material, such as one or several polymer material layers or the like is arranged in connection with the knitted layer, that has been produced, at least partly built-in during production.

The method according to the invention is applicable for manufacturing of protective material for most heterogeneous purposes. Thus the protective material according to the invention may be advantageously used as manufacturing material particularly for example for protective clothings, such as for safety gloves or the like intended particularly for medical purposes.

BACKGROUND OF THE INVENTION

In the purpose above, safety gloves made of most heterogeneous materials are presently very generally used, that are usually made by a soaking method or dipping. Particularly because of todays dangerous deseases (e.g. AIDS), that are easily infectious, it is first and foremost important to achieve simultaneously when using a safety glove both adequate hygienic protection to prevent e.g. virus, bacteria infections or the like and mechanical protection e.g. against unintended cuts and injections. Safety gloves that are being used in this purpose today do not work well enough. That is why it is very common to use two safety gloves one on another, which naturally makes the use of the safety gloves slower and more difficult. The use of two gloves one on another does not, however, improve mechanical strenght of the basic material of the safety glove decisively particularly considering durability against injections or cuts. This is why in the type of safety gloves in question there has been applied e.g. different kinds of chemical indication arrangements, so that a damage of the safety glove could be revealed e.g. by a change in color at a wounded point of the safety glove. However, during an operational situation, in practice, the situation must be considered as a whole so, that when the condition of the patient is critical, the person making an operation is not always able to change the safety glove even if it has broken. This is why a person making e.g. surgical measures continuously may very often be involved to risk his own health for the sake of the patients' interests.

Finnish Patent Application No. 931396, "Menetelmä ja lajitelma kehon tai sen osan suojaamiseksi ja/tai sen toiminnan tehostamiseksi", presents a solution, developed in certain ways with respect to present safety gloves, particularly when compared to those mentioned before. In the invention in question, it is first of all essential, that the clothing to be dressed, such as a protective glove or like, is equipped with ducts transmitting energy, such as with light fibers or the like e.g. to lead light to the operating point along fingers.

The safety glove that is included in the solution in question, comprises as an advantageous embodiment an elastic structure part, that is knitted or woven from high-tenacity fibers made of polymer, whereby as the fiber types different kinds of coal and polyethene fibers, aramid fibers, tissues and/or the like are being used, in which case the protective glove stands further e.g. both autoclaving and ethylene claving, that is performed e.g. in connection of a sterilization of the safety glove enabling re-use of the same.

When making the type of clothing or protective glove in question, multi-layered e.g. the inner layer by knitting, as described above from strong artifical fibers and the outer layer e.g. from rubber, plastic material or like, that withstands chemicals and bacteria, a mechanically strong and well protecting clothing in practice is achieved. In the solution in question e.g. the lighting effect is achieved by a second structure part, that is attached removeably or in an integrated manner with the inner layer, that has light fibers or like to lead light.

Thus, the solution in question comprises as an advantageous embodiment for certain purposes a safety glove or the like with a light effect, which is not, however, necessary under all circumstances. Furthermore, the principle of the structure represented in the solution above is disadvantageous in the sense that the knitted layer produced from artificial fibers is, when being placed the way described above, directly against the skin. That is why an adequate sterilization of the same is difficult and expensive to carry out. On the other hand, during the development of the solution in question, a crucial problem that was found at that time was inadequate sensibility of the protective glove that was being developed in that connection. This is why there had to be stated in the Patent Application about the use of the safety glove for e.g. operative surgical operations of neurosurgery, that for this kind of purpose the fingertips must be left open to achieve better sensibility.

In principle, the solution in question is thus a step to the right direction. However, it can not as such, solve well enough a very common and difficult problem, e.g. regarding surgery in practice or other the like purposes, that is to give in every respect simultaneously good enough both mechanical protection and non-mechanical protection for all purposes and under all circumstances.

SUMMARY OF THE INVENTION

It is the aim of the method according to the present invention to achieve a decisive improvement in the problems presented above and thus to raise substantially the level of knowledge in the field. To achieve this aim, the method according to the present invention is primarily characterized in that particularly to optimize the sensibility and safety enabled by the protective material at least one knitted layer belonging to the first part material is being produced, preferably from a single jersey knitting or from a derivative of the same by adapting a machine gauge at least 10 needles per English inch.

The most important advantages of the method according to the present invention the profitability particularly considering both safety and usability of the protective material enabled by the same. With the protective material produced according to the present invention, it is possible to solve simultaneously the problems concerning both sensibility and adequate mechanical strength as well as non-mechanical protection. After a long period of research and development as well as experimental operations in practice, there has been found that by using a rather fine machine gauge when knitting the knitted layer, it is possible to achieve a thin enough knitted layer particularly considering sensibility, in which the surface area enabling free penetration is extremely minimal. In the method according to the present invention it is further particularly advantageous to take advantage of a rather thin polymer fiber material, whereby when utilizing advantageously a flat knitting machine, based e.g. on sinker techniques and having preferably a gauge of 13 needles per inch or more, it is possible to achieve a very sensitive and moreover even a completely fully fashioned knitted item. The usual gloves being correctly produced with automatic machines in practice are in principle, one piece knitting, but until now there has been no need in practice to produce completely fully fashioned gloves. This is why concerning gloves produced e.g. by conventional techniques there has always been used always an equal number of needles e.g. in fingers along the whole length of each finger. That is why the stitch density of usual present gloves varies at various points of a glove, especially in finger knitting.

The method according to the present invention thus enables production of a protective material, which when being used particularly as a manufacturing material for clothing, such as for a safety glove to be used particularly for medical purposes, offers in the same connection significantly better hygienic protection, mechanical protection against cuts, injections or the like as well as sensibility, when compared to present corresponding solutions. When applying the method according to the present invention advantageously, the protective material may in this connection furthermore be strenghtened in certain respects either by solutions based on knitting techniques or process techniques in connection of the manufacturing process; e.g. the thickness of the safety glove may be varied at various points of the same, e.g. to be thicker from the back side than from the palm side, preferably by adapting e.g. intarsia techniques during knitting. Additionally the method according to the present invention permits the protective material to comprise e.g. a built-in coloring or patterning, that has been arranged during the manufacturing.

Advantageous embodiments of the method according to the present invention are described below.

The present invention also relates to an elastic protective material. The protective material and the primary characteristics of the protective material are also described in greater detail below.

With the protective material according to the present invention, it is possible to achieve better protection simultaneously both against mechanical and hygienical strain, than with materials presently being used for corresponding purposes. The significantly high numbers of needles per inch being used during production of the knitted layer belonging to the protective material according to the present invention combined with the use of significantly fine polymer fiber material, enables furthermore that, that the sensibility of a protective clothing formed of the protective material, such as of a safety glove or the like, is significantly better than those of the same being used nowadays. One primary advantage of the protective material according to the invention is thus, when being used particularly as a manufacturing material for a safety glove, that it is also possible to be protected by only one glove well enough under all circumstances during extremely demanding surgical operations. The mechanical characteristics of the protective material according to the invention may furthermore be improved e.g. by using a knitted layer in the same, the tightness of which, such as the cover factor value, has been improved by means of process techniques or knitting techniques. With the aid of the protective material according to the invention it is furthermore possible to achieve e.g. a three-dimensional, completely fully fashioned end product, that has been finished to the very end during production of the same. Also, it is possible to achieve the coloring, material thickness, total dimensions and/or the like, which are determined in advance. In this case, it is furthermore possible to adjust e.g. the mutual material thicknesses of palm side/back side of the glove.

Advantageous embodiments of the protective material according to the invention are described below.

BRIEF DESCRIPTION OF THE DRAWINGS

In the following description, the invention is illustrated in detail with reference to the appended drawings. In the drawings, FIG. 1 shows a protective material, that has been produced by means of the method according to the present invention, as a principle cross section and FIG. 2 shows in principle arrangements, that have been used particularly in connection of the knitted layer belonging to the protective material, to improve the characteristics of the same.

DETAILED DESCRIPTION OF THE INVENTION

The invention relates to a method for producing elastic protective material, which is formed of at least two part materials being in connection with each other. The first part material 1 is intended particularly to give mechanical protection, such as to prevent a concrete object from breaking through the same. The second part material 2 is intended particularly to give non-mechanical protection, such as to prevent gas, liquid and/or like from going through the same. To achieve an elastic protective material the first part material 1 is being produced at least partly by knitting preferably from polymer fiber material 1a or like. The second part material 2, such as one or several polymer material layers 2' or like, is arranged in connection with the knitted layer 1', that has been produced at least partly built-in during production. To optimize particularly the sensibility and safetyness enabled by the protective material, at least one knitted layer 1' belonging to the first part material is produced, preferably from a single jersey knitting or from a derivative of the same by adapting a machine gauge of at least 10 needles per English inch.

As an advantageous embodiment of the method according to the present invention, the protective material is intended to be used particularly as manufacturing material of a three-dimensional protective equipment that is meant to be dressed. In this case the first part material 1 belonging to the same is produced from yarn preferably made of high-tenacity organic polymer fiber material 1a, such as polyethene fiber (UHMPE), aramid fiber (PPTA), liquid crystal fiber (LCP) and/or like. The knitted structure 1' belonging to the first part material 1 is produced from thin polymer fiber material 1a, the thickness of which is preferably between 80–440 dtex. In this connection, preferably a flat knitting machine, being preferably based on sinker techniques and having a gauge of 13 needles per inch or more and enabling a completely fully fashioned knitted structure (1'), is used. In this connection, the definition completely fully fashioned means, that the stitch density is essentially constant at various part areas of the three-dimensional knitted clothing when it is being dressed.

As a particularly advantageous embodiment, the method is adapted for the purpose of the protective material serving as manufacturing material for medical purposes, such as to be used for production of protective bandages, safety gloves, protective footwears or headpieces and/or the like. In this case with reference for example to FIG. 1 the second part material 2 surrounding the first part material 1 entirely, is produced preferably from antiseptic and sterilizeable elastomer, polymer, and/or the like, such as from polyurethane (PUR), ethyl-vinylacetate (EVA), polyethene (PE) and/or the like. In this connection, particularly to increase the efficiency of the protective material considering particularly heavy point loads, such as to prevent penetration of a sharp cut, injection or like, the protective material is strenghtened during manufacturing by means of knitting techniques, process techniques and/or correspondingly, to reduce particularly the surface area of one or several part materials 1, 2 of the protective material enabling free mechanical permeability.

Further as an advantageous embodiment the protective material is strenghtened by means of knitting techniques during production, to reduce particularly the surface area of the knitted layer 1', such as cover factor value of the same or like, belonging to the first part material 1, enabling free mechanical permeability, by adapting whiskers 1a", staple yarns, fibers and/or the like as the polymer fiber material 1a or as part of the same, as shown detail B of FIG. 2. In this connection it is also possible to act so that plush-loop yarns 1a''', lay-in yarns 1a"" or the like complementing the knitted structure are used while knitting as shown in detail A of FIG. 2.

As an advantageous embodiment of the method according to the present invention in connection with the knitted layer 1', that has been produced, there is arranged integratedly another compound layer 2' belonging to the second part material (2), preferably by a coating method and/or the like, such as by dipping, injection, painting, spraying and/or the like. In this connection it is possible to strenghten the protective material by means of process techniques during production, to reduce particularly the surface area of the knitted layer 1' belonging to the first part material 1, enabling free mechanical permeability, by adapting as shown in the detail B of FIG. 2, preferably metal, ceramic, stone, glass, fiber and/or like based filling materials y as a part of the second part material 2, such as parts of one or several compound layers 2', strenghtening mechanical durability of the same. As a practical embodiment, it is possible to take advantage of so called Whiskers y' in this connection as shown in the detail B of FIG. 2. In this connection, it is naturally possible to adapt yarn material as the polymer fiber material 1a or as part of the same, the cross-sectional surface area of which is extendable preferably by a thermal, pressure, chemical and/or corresponding after-treatment (cf. mercerizing).

As a particularly advantageous embodiment of the method, the characteristics of the knitted layer 1' belonging to the protective material, such as strenght, color, thickness and/or the like at various part areas of the same, is being varied by forming the knitted layer 1' from part layers I, II, that differ from each other by characteristics of the same. In this connection, preferably so called intarsia techniques are adapted during knitting according to FIG. 2. When adapting intarsia techniques, the knitted layer 1' is formed of successive part layers I, II, in which case there are not any so called plush-loop or lay-in yarns at the back side of the knitting. By adapting the techniques in question, it is thus possible to combine "jointlessly" part areas to the product, in which there have been used differing yarn types 1a", thicknesses 1a, 1a' or even differing structure types at various layers I, II e.g. as shown in FIG. 2.

Furthermore as an advantageous embodiment of the method, at least one compound layer 2' belonging to the second part material 2 is arranged in connection with at least one knitted layer 1' belonging to the first part material 1, by forming a uniform polymer film or a three dimensional structure, preferably by means of positive pressure, such as by blow molding or accordingly, and/or by means of negative pressure, such as by vacuum forming or accordingly, whereby layers 2', 1' are connected to each other at least partly in an integrated manner preferably by means of e.g. a thermal, pressure and/or chemical lamination treatment.

As explained above, the mechanical protection effect of the protective material according to the invention is achieved by means of a knitted layer 1' knitted particularly of a thin filament yarn. In practical tests being performed, it has been found profitable to use furthermore a plane knitting machine based on sinker techniques and e.g. having a gauge of 13 needles per inch or more, by means of which it is possible to produce, as described above, a uniform and exact measured fashion knitting (taylor made). As described above, the various part areas of the knitting may be strenghtened both in the sense of strength of materials and physically as desired if needed e.g. by producing the upper side of the so called safety glove e.g. thicker than the lower side, as explained above. In this connection, it is advantageous to use as the knitted structure further e.g. a two-dimensional single jersey-structure or a three-dimensional e.g. pigue-structure. E.g. in a single jersey-structure an advantageous width of the stitch is proved out to be 1 and the height of the same 1.3.

The protective material according to the invention may be produced as explained above to a three-dimensional shape e.g. in a way, that the polymer material layers 2'a, 2'b, that have been separately integrated to the knitted layer 1' according to the principle as shown in FIG. 1, are achieved by dipping, vacuum forming and/or blow molding as described above. In this connection, one possible way to produce e.g. gloves from protective material according to the invention is e.g. two-stage dipping, whereby the inner surface 2'a of the glove is first formed by using hand molding, whereafter the knitted layer 1' is placed on a coated hand mold. After this, the knitted layer will be furthermore integrated throughout inside the polymer material 2 with a second dipping 2'b. In this connection, it is possible to use various materials during various dipping stages, in which case inner and outer surfaces having differing characteristics are provided to the manufactured product.

On the other hand, by means of the above mentioned vacuum forming and/or blow molding methods, a totally or partly integrated end structure of the product may be achieved. In this case, as an advantageous embodiment, raw material is formed by means of vacuum forming aided by heat and negative pressure e.g. on a hand mold to achieve the inner surface 2'a of the glove. After this the knitted layer 1' is placed on the coated hand mold, whereafter the outer surface 2'b is formed e.g. the same way as the inner surface. In this connection it is possible to adjust the degree of integration by means of heat treatment. On the other hand, it is also possible to use blow molding and vacuum forming in the same connection, whereby a glove preform is being formed first by blowing a film on a negative mold, which is thereafter being formed by vacuum on the surface of a positive glove mold.

An elastic protective material according to the invention is thus formed according to FIG. 1 of the first part material 1 that gives, particularly, mechanical protection and of the second part material 2 that particularly provides non-mechanical protection. The first part material 1 is produced by knitting from polymer fiber material 1a, whereby the second part material 2, such as one or several polymer material layers 2' is arranged in connection with the knitted layer 1', that has been produced as explained above partly or totally built-in during production. The knitted layer 1' belonging to the first part material 1 of the protective material according to the invention, is produced, preferably from a single jersey knitting or from a derivative of the same by adapting a machine gauge at least 10 needles per English inch.

Further as an advantageous embodiment, the knitted layer 1' in the protective material to be used particularly as manufacturing material of a three-dimensional protective equipment or a like, that is meant to be dressed, is produced from yarn preferably made of high-tenacity and thin organic polymer fiber material, the thickness of which is preferably between 80–440 dtex. In this connection, preferably a flat knitting machine, being preferably based on sinker techniques and having a gauge of 13 needles per inch or more, is used. As shown in FIG. 1 it is possible to produce protective material, in which the thickness h1 of the knitted layer 1' is, for example, 100 $\mu$meter, whereby the total thickness h2 of the protective material is, for example, 110 $\mu$meter.

On the other hand it is furthermore possible to improve the suitability of the protective material for example for surgical purposes or the like, whereby the protective material is strenghtened during manufacturing by means of knitting techniques, or process techniques, to reduce particularly the surface area of the knitted layer 1' enabling free mechanical permeability. In this connection, it is possible to solve the matter by adapting whiskers 1a'', staple yarns, fibers and/or the like as the polymer fiber material 1a or as part of the same, as shown in detail B of FIG. 2, or on the other hand by using plush-loop yarns 1a''', lay-in yarns 1a'''' or like complementing the knitting as shown in detail A of FIG. 2.

For the above purpose, it is possible to strenghten the protective material during production of the same furthermore by means of process techniques. Thus, when adapting, for example, dipping during production, filling materials y, such as whiskers y' or the like, have been used, as shown in the details A and B of FIG. 2, as a part of the second part material 2, such as of one or several compound layers 2', strenghtening mechanical durability of the basic material. In this connection, it is naturally possible to adapt yarn materials in the knitting, also, the cross section area of which have been expanded by after-treatment.

As a particularly advantageous embodiment, the knitted layer 1' belonging to the protective material, is formed of part layers I, II connected to each other by intarsia-techniques, the characteristics, such as strenght, color, thickness and/or the like of which differ from each other. In this way varying of the characteristics, such as durability, appearance, sensibility and/or the like of the end product being produced from the protective material, are enabled at various part areas of the same. Furthermore, this enables attaching of different kinds of product marks in an integrated manner during manufacturing or direct adjustment of the direct sensibility by using differing yarn thicknesses 1a, 1a' or yarn types 1a'' in various parts of e.g. a protective or safety glove.

It is obvious, that the invention is not limited to the embodiments presented or described above, but it can be modified within the basic idea even to a great extent. This is due to fact that the method according to the present invention may be carried out technically in very many ways, as explained above, by using most heterogeneous manufacturing materials and techniques, in which case the represented guide-like operational measures and pictures show only general principles of certain advantageous embodiments. The method and a protective material being produced by the same according to the present invention is thus possible to apply in most heterogeneous connections for most heterogeneous circumstances and purposes.

We claim:
1. A method for producing an elastic protective material, said method comprising the steps of:
    knitting a first material part from yarn made of a polymer fiber material, at least one layer of said first material being produced by single jersey knitting to form a three dimensional fully fashioned knitted structure by adapting a machine gauge of at least 10 needles per inch;
    forming a second material part, having at least one layer of polymer material, made from an antiseptic and sterilizable elastomer or polymer to completely surround said first material part both outside and inside of the first material part.

2. The method according to claim 1, wherein the knitted structure is produced from thin polymer fiber material, the thickness of which is between 80–440 dtex, by means of a flat knitting machine being based on sinker techniques and having a gauge of 13 needles per inch or more, to a completely fully fashioned knitted structure, in which the stitch density is essentially constant at various part areas of the knitted structure.

3. The method according to claim 1, wherein the protective material is strengthened by means of knitting techniques during production to reduce the surface area of the knitted layer, which enables free mechanical permeability by using plush-loop yarns, or lay-in yarns complementing the knitting.

4. The method according to claim 1, wherein the protective material is strengthened by process techniques during production to reduce the surface area of the knitted layer, which is extendable by an after-treatment.

5. The method according to claim 1, wherein regions of the knitted layer of the protective material are varied by forming the knitted layer from differing part layers by adapting intarsia techniques during knitting.

6. The method according to claim 1, wherein at least one compound layer belonging to the second part material is arranged in connection with the knitted layer of the first part material, by shaping a uniform polymer film three-dimensionally by means of positive pressure or by means of negative pressure, whereby said layers are connected to each other in an integrated manner by means of a thermal, pressurized or chemical lamination treatment.

7. The method according to claim 2, wherein the knitted structure is a three-dimensional safety glove.

8. The method according to claim 4, wherein the after-treatment is thermal, pressure, or chemical.

9. An elastic protective material comprising:
    a first material part made of a polymer fiber material, at least one layer of said first material being produced by single jersey knitting to form a three dimensional fully fashioned knitted structure by adapting a machine gauge of at least 10 needles per inch;
    a second material part, having at least one layer of polymer material, made from an antiseptic and sterilizable elastomer or polymer to completely surround said first material part both outside and inside of the first material part.

10. The protective material according to claim 9, wherein the knitted structure comprises a completely fully fashioned knitted structure, in which the stitch density is essentially constant at various part areas of the knitted structure, and that is produced by means of a flat knitting machine, being based on sinker techniques and having a gauge of 13 needles per inch or more, from thin polymer fiber material the thickness of which is between 80–440 dtex.

11. The protective material according to claim 9, wherein the protective material is strengthened by means of knitting techniques being adapted during production to reduce the surface area of the knitted layer, which enables free mechanical permeability by using plush-loop yarns, or lay-in yarns complementing the knitting.

12. The protective material according to claim 10, wherein the protective material is strengthened by process techniques adapted during production to reduce the surface area of the knitted layer, which enables free mechanical permeability, by adapting yarn material as the polymer fiber material or as part of the same, the cross-sectional surface area of which is extendable by an after-treatment.

13. The protective material according to claim 9, wherein the knitted layer of the protective material is formed of part layers connected to each other by intarsia-techniques, the the part layers differing from each other, at least to enable durability, appearance, or sensibility of a safety glove formed of the protective material to vary at various areas of the safety glove.

14. The protective material according to claim 10, wherein the knitted structure comprises a three-dimensional safety glove.

15. The protective material according to claim 12, wherein the after-treatment is thermal, pressure, or chemical.

* * * * *